United States Patent [19]

Gustafsson

[11] Patent Number: 5,302,794
[45] Date of Patent: Apr. 12, 1994

[54] MICROWAVE APPARATUS FOR DRYING AIR

[76] Inventor: Per E. Gustafsson, Stjarnvagen 26, S 541 55 Skovde, Sweden

[21] Appl. No.: 957,453

[22] Filed: Oct. 7, 1992

Related U.S. Application Data

[63] Continuation of Ser. No. 500,310, Mar. 28, 1990, abandoned.

[30] Foreign Application Priority Data

Mar. 28, 1989 [SE] Sweden .................. 8901070
Feb. 9, 1990 [SE] Sweden .................. 9000471

[51] Int. Cl.$^5$ .............................. H05B 9/06
[52] U.S. Cl. .................... 219/688; 34/1 P; 34/4
[58] Field of Search ........... 219/10.55 R, 10.55 M, 219/10.55 A; 34/1, 10, 4, 6, 7, 80

[56] References Cited

U.S. PATENT DOCUMENTS

| | | | |
|---|---|---|---|
| 3,083,528 | 4/1963 | Brown | 219/10.55 A |
| 3,555,693 | 9/1968 | Futer | 34/1 |
| 3,716,688 | 2/1973 | Johnson | 219/10.55 A |
| 4,023,279 | 5/1977 | Janda | 34/1 |
| 4,114,012 | 9/1978 | Moen et al. | 219/10.55 R |
| 4,205,459 | 6/1980 | Koseki et al. | 34/80 |
| 4,223,448 | 9/1980 | Saito et al. | 34/4 |
| 4,330,946 | 5/1982 | Courneya | 34/1 |
| 4,622,446 | 11/1986 | Sugisawa et al. | 219/10.55 R |
| 4,629,849 | 12/1986 | Mizutami et al. | 219/10.55 A |
| 4,653,199 | 3/1987 | McLeod et al. | 34/80 |
| 4,805,317 | 2/1989 | Inglis et al. | 34/80 |
| 5,195,251 | 3/1993 | Gyuresek et al. | 34/22 |

FOREIGN PATENT DOCUMENTS

| | | |
|---|---|---|
| 0016385 | 3/1980 | European Pat. Off. |
| 7800128 | 10/1978 | PCT Int'l Appl. |
| 454849 | 2/1986 | Sweden |
| 1543160 | 11/1976 | United Kingdom |

Primary Examiner—Bruce A. Reynolds
Assistant Examiner—Tu Hoang
Attorney, Agent, or Firm—Cushman, Darby & Cushman

[57] ABSTRACT

Microwave energy is used to dry air. Moist air is forced through an absorbing or adsorbing material and the material is regenerated by heat from one or more microwave transmitters. The drying material is placed in a magazine, the greater walls of which permit air to pass and at least one of the walls reflecting microwaves. A drying room placed adjacent the magazine contains at least one microwave transmitter. Moving bodies can be used to spread the waves over the magazine surface for even drying. Several combinations of the above components can be used together in several ways based upon the ground components.

15 Claims, 3 Drawing Sheets

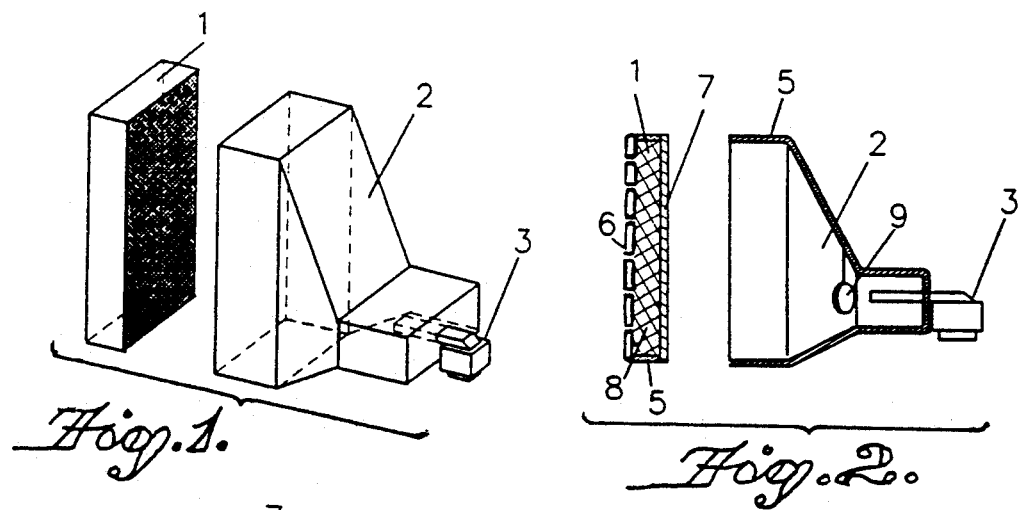
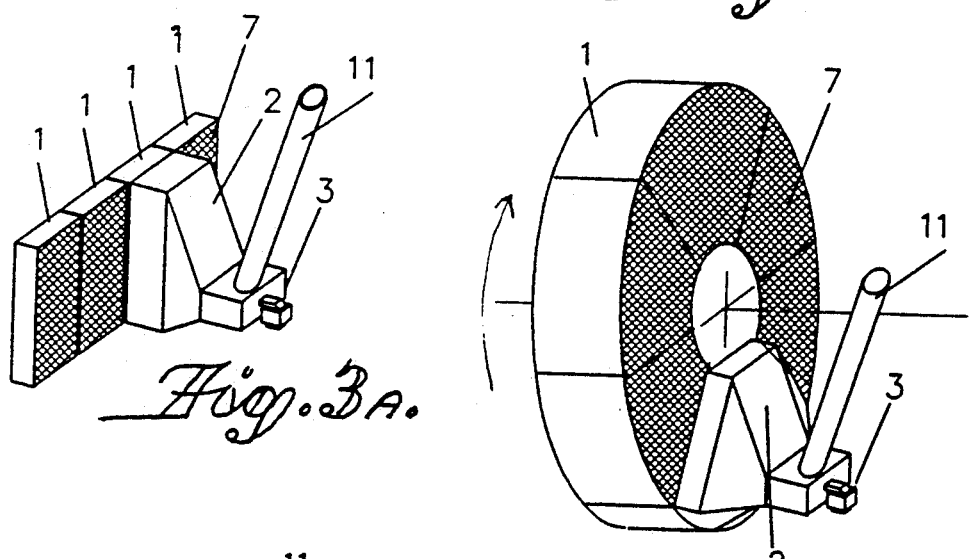
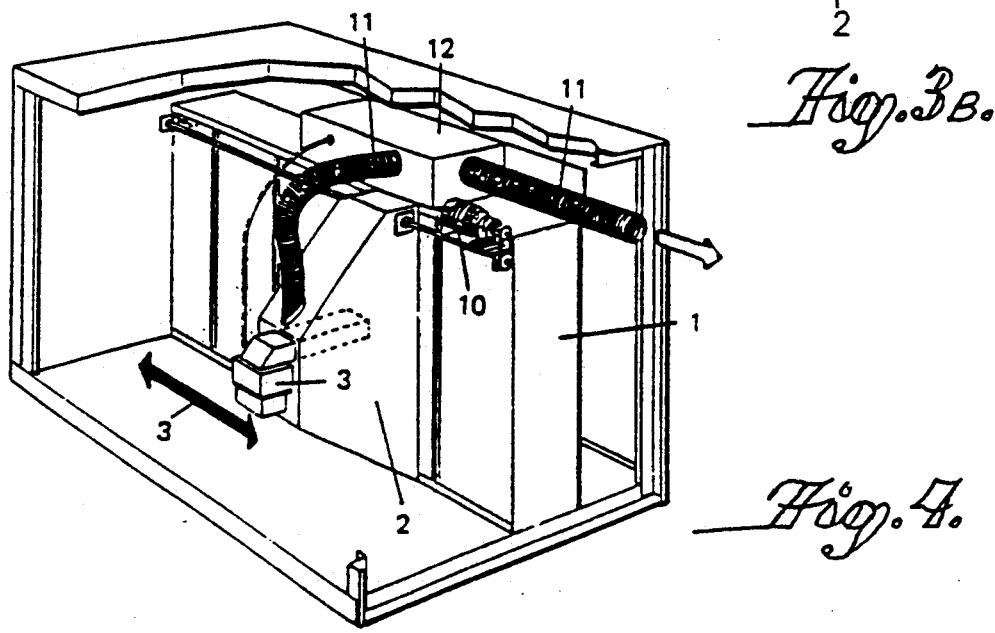

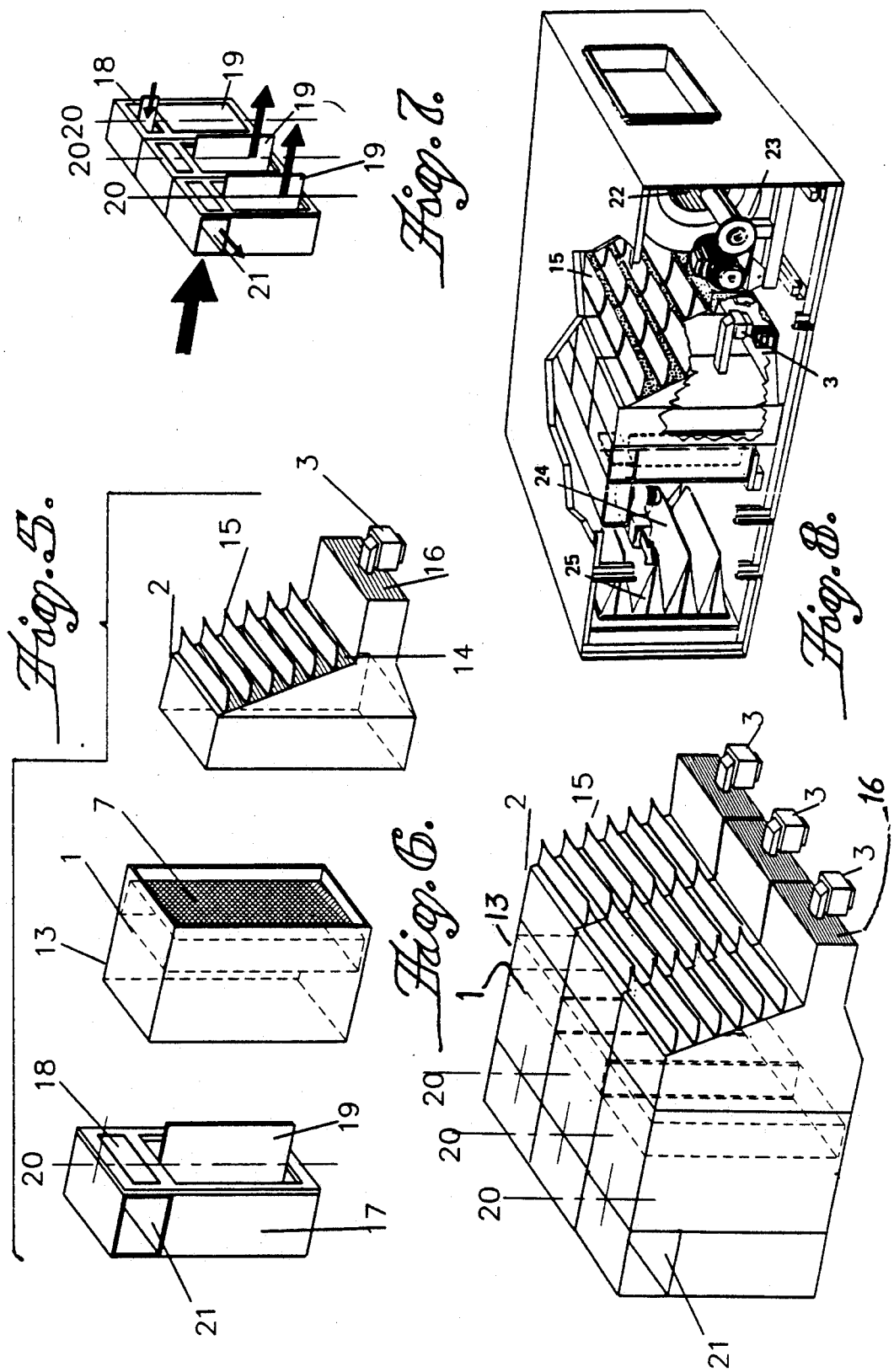

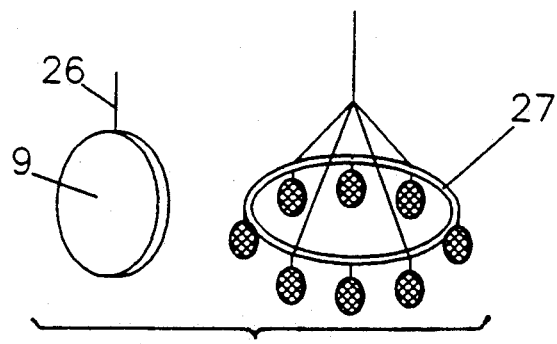
Fig. 9.
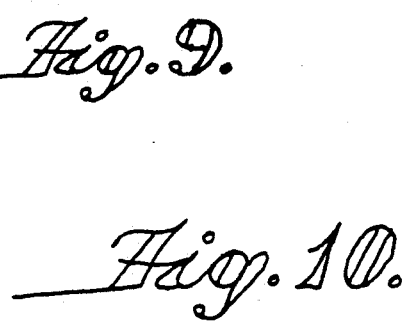
Fig. 10.
Fig. 11.
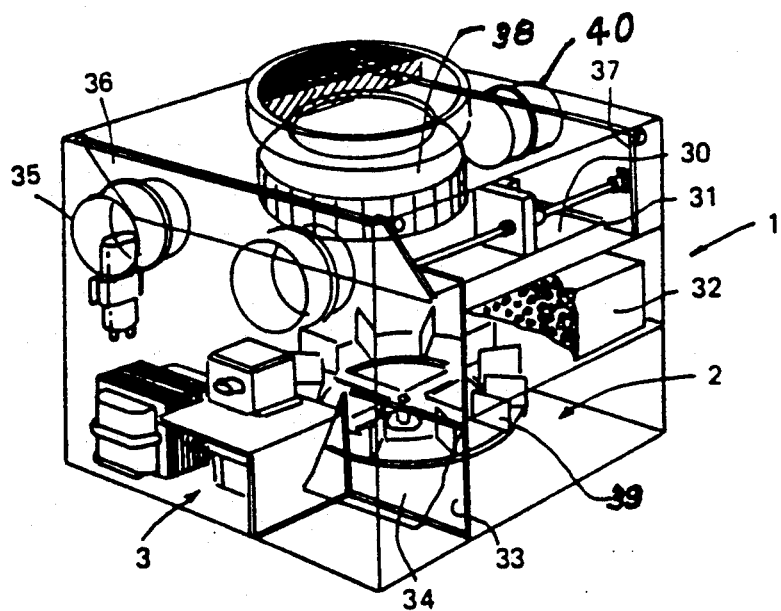

MICROWAVE APPARATUS FOR DRYING AIR

This is a continuation of application Ser. No. 07/500,310, filed on Mar. 28, 1990, which was abandoned upon the filing hereof.

FIELD OF THE INVENTION

A large problem in modern life is moist air in buildings. The moisture can come from many sources, including the curing of concrete, air being cooled below the dew-point or the air just being saturated. One result of moist air is that iron tends to rust. The present invention deals with the removal of moisture from the air. Old means of handling this problem are often very energy inefficient. Presently, microwave heating can be used to heat only the water molecules in a substance and thus dry water absorbing or adsorbing materials. It is in this technical field that the present invention presents a new apparatus for drying moist air.

BACKGROUND OF THE INVENTION

It is well known that some materials take up water from moist air. Cellulose and diatomaceous earth are the examples of such materials. The skilled man knows several others. When the material becomes saturated with moisture, no further moisture can be taken up. But the materials can be regenerated (i.e. remove the moisture) with heat. Hot air can be used for regeneration or the materials can simply be put into a container which is then heated.

The absorbing or adsorbing technique and further regeneration is well known. But the regeneration of drying material is to some extent new. In the present inventor's Swedish patent SE 454 849, microwaves are used to regenerate drying materials. The distribution of these waves at a normal atmospheric pressure level is the problem that the present invention deals with.

Drying of compressed air is important for the vessels that contain that air. Here, NO 154 419 and EP 016 385 of a U.S. inventor teach the same heating technique but without the problem of spreading the microwaves over as large a surface as is necessary in ordinary air drying at an atmospheric pressure level. PCT/US78/00128 treats other materials saturated with other gases than the present invention.

SUMMARY OF THE INVENTION

The present invention presents an apparatus for drying air. The apparatus comprises different parts that are easily put together and included in conventional heat exchange equipment. The apparatus provides a competitive way to dry air with only small amounts of energy. The apparatus can lower the relative humidity in a room, which can be advantageous, for example, in storing rooms where steel might rust.

In the present invention, moist air is forced through an absorbing or adsorbing drying material and because of that, the moist air becomes less moist or completely dry. The drying material is then periodically dried or regenerated by the use of microwave energy which is distributed over the drying material in a room with reflecting walls for regenerating. A reflecting body that is moved and/or rotated is inserted in cases where needed for a more even distribution of the microwaves.

The drying material is preferably held in magazines that permit transmission of the moist air through at least two of the sides of the magazine. The magazine is transparent for microwaves on one side opposing one or more microwave transmitters and closed on all other sides for those waves. A preferable type of magazine is in the shape of a parallelepiped with two large sides, one of which is transparent and one closed for microwaves but both being perforated so as to permit moist air to pass through the magazine in both directions.

The magazine is normally placed in a room where the walls reflect the microwaves. The microwaves can be further distributed by a moving reflecting body in the room when needed. As only the drying material in the room can take up the microwave energy, the microwave energy is reflected until most of it is used to heat up the drying material. Experience shows that if the moist air is forced through the magazine in one direction on drying, it is advantageous if the air for regeneration of the drying material is forced in the opposite direction out of the magazine.

Some drying materials have a tendency to stick together and form clumps. It is a feature of the invention that the magazine containing the drying material can easily be removed to change the material. This feature is also very advantageous when cleaning or servicing the equipment.

A change of direction of air flow through the magazine is performed by flaps or doors such that, when one way through the magazine opens, the other way simultaneously becomes closed.

The magazine, the regenerating room with reflecting walls and the moving reflecting body are components in the drying equipment along with other well-known parts like fans, filters and valves.

Several drying modules can be used together with only one air handling fan, thus being capable of drying large amounts of air. This also allows a cyclic drying in several drying modules and simultaneous regeneration in a fewer number of modules.

With the foregoing in mind, other objects, features and advantages of the present invention will become more apparent upon consideration of the following description and the appended claims with reference to the accompanying drawings, all of which form part of this specification, wherein like reference numerals designate corresponding parts in the various figures.

BRIEF DESCRIPTION OF THE DRAWINGS

FIG. 1 is an exploded perspective view of the characteristic parts of the invention with its magazine and regenerating room;

FIG. 2 is a side view of the magazine and regenerating room as shown in FIG. 1;

FIG. 3a is a perspective view of multiple magazines in a row;

FIG. 3b is a perspective view of multiple magazines forming circular sectors of a disc;

FIG. 4 is a cut-away view of one commercial embodiment of the present invention;

FIG. 5 is an exploded perspective view of an alternative embodiment of the present invention;

FIG. 6 shows an assembly of multiple modules of the embodiment shown in FIG. 5.

FIG. 7 shows the air flow through the modules shown in FIGS. 5 and 6;

FIG. 8 is a cut-away view of a commercial arrangement of this equipment;

FIG. 9 is a perspective view of one type of microwave reflecting body;

FIG. 10 shows an alternative embodiment of a microwave reflecting body; and

FIG. 11 is a cut-away view of a portable drying apparatus using the typical components.

DETAILED DESCRIPTION OF THE PREFERRED EMBODIMENT

In FIGS. 1 and 2, examples of the elements of the invention are shown, a magazine 1 and a regenerating room 2 with its microwave transmitter 3.

The magazine 1 and the regenerating room 2 have walls 5 all around which reflect microwaves. These walls 5 are preferably made of steel or aluminum sheet material. Moist air is forced through the magazine 1 in one direction. The first side the moist air penetrates, the front side 6, reflects the microwaves but is perforated to permit air to pass through. This perforated metal sheet can have circular apertures. In one embodiment, the diameter of the apertures is 5-6 mm. Other forms for holes that let air but not microwaves through are known to the man skilled in the art.

The other large side wall 7 of the magazine permits microwaves and air to get through. Glass and/or plastic materials can be used, among many others. This side wall 7 is mainly used to keep the adsorbing or absorbing material 8 in the magazine 1.

A moving reflecting body 9 is also shown in FIG. 2. Here a circular disc hung on a thin thread is used. As air is forced around it, it is swung and rotated in a way to spread the microwaves. Other forms of the moving body 9 will be discussed later. The movement of the body 9 can be caused by the flow of air or also by some machinery.

The magazine in FIG. 1 is a parallelepiped, but the cut shown in FIG. 2 could also be that of a sector. Other shapes can also be used.

FIGS. 3a and 3b show the assembly of multiple magazines. While most of the magazines are used to dry moist air, one of the magazines in each Figure is set in a regenerating position. In FIG. 3a, the regenerating component with the microwave transmitter is moved periodically so as to regenerate the drying substance in one magazine after another. The movement of the regenerating part 2 can also be seen in FIG. 4, which shows the drying equipment in a larger fan complex. In one embodiment, the movement is performed by a step motor 10.

In FIG. 3b, a similar arrangement is shown. Here the magazines 1 form a circular disk. Each sector has reflecting walls as the previous embodiment. The shape of the regenerating room is adapted to the circular form. One sector after another is put in a regenerating position as the disk is turned round an axle (not shown), the center of which is marked in the Figure. This sector form for the magazine is especially advantageous when the disk is vertical and turned around a horizontal axle as the drying material is moved in the sector magazine. This prevents the drying material from forming clumps.

For the regeneration, ordinary moist air is used and forced through the drying substance. This is not as satisfactory as the other methods described later. But the cost for production of the equipment is lower. The air from the regeneration is sucked out of the regenerating room through the pipe 11 by a fan 12 in FIG. 4. Other sucking means are known by the skilled man.

FIG. 5 is similar to FIG. 1. Here the magazine 1 is put in a rectangular tube 13 to give room for two flaps or doors 18 and 19, which guide the air through the drying component. The tube is made of microwave reflecting material and can also be used to increase the size of the regenerating room. As it is a separate unit, it can be given a lid for removing the magazine 1, when cleaning or substituting drying material. The regenerating room 2 may now consist of a part from the tube 13 and the old regenerating room 2 with its microwave transmitter and a moving body 9. It still has a wall that reflects microwaves but portions of the walls 14 and 16 of room 2 are now made of a perforated material that permits air to pass through.

Most of the air now has to pass one of the walls 14. To stop air flow from the outside through that wall when regenerating, the wall is covered with textile flaps 15, which lift when air is forced out of the room, but lower and close the aperture in the wall when air is sucked into the room 2. Other methods of constructing a one directional flow are known to men skilled in the art.

This embodiment has the advantage over the one described in FIG. 4 in that moist air is passed through the drying material 8 in one direction but on regenerating, the air is forced out of the magazine 1 in the opposite direction. This is the reason for the air guiding device 17. The device has two flaps or doors 18 and 19 mounted on the same shaft 20 so that when one flap is in an open position, the other is closing the connection to the tube 13.

The ordinary moist air is taken into the module through the flap or door 19, goes through the absorbing material and out of the regenerating room 2 under the textile flaps 15. Some air also passes through the wall 16.

When regenerating, the air is sucked through the wall 16 and through the drying material in a reverse direction then during drying. The door 19 is closed and instead door 18 is open and the air from the regeneration can leave the module through channel 21. During this operation, the transmitter 3 is on and as air is sucked around the transmitter it also puts a reflecting body 9 into motion. The textile flaps are down and almost all regenerating air can be used to move one or more bodies 9.

A cyclic change from drying to regenerating is easily performed by skilled men. Normally most of the time is used for drying. Only a short regeneration time is needed compared to the drying time.

In FIG. 6, three modules of the last embodiment have been placed together. Any number of modules can be placed together in this manner. All three can be used to dry air at the same time. However, it is advantageous to use most of the modules to dry air while simultaneously regenerating only one or a few of the magazines.

The air guiding devices 17 are used for controlling the number of modules drying and regenerating at one time. The doors 18 and 19 are mounted on the same shaft 20 and turning the corresponding shafts 20 in a proper sequence makes it possible to regenerate in one module and dry in the other two as shown in FIGS. 6 and 7. The upper part of the device 17 forms the channel 21 that is open only to the module where regeneration is being performed. Any man skilled in the art can set up a time sequence for the turning of the door shafts so that a cyclic regeneration is performed in all modules. Other methods of closing and opening of the doors 18 and 19 can naturally be found. FIGS. 6 and 7 only show a successful way of using the invented principle.

A commercial embodiment using the previous embodiment is shown in FIG. 8. Here, one can observe that a fan 22, driven by a motor 23, is used to suck all the moist air through the equipment. Another fan 24 is used to suck regenerating air out of the apparatus. Conventional filters 25 are also included.

To spread the microwaves, normally only the walls are needed as they are made of reflecting material for perforated plates with apertures that do not permit an escape of microwave energy. However, only small changes in the orientation of the transmitter or the magazine 1 can disturb an even distribution of the wave energy. Therefore, the use of a moving reflecting body 9 has proven advantageous. In FIG. 2, it consists of a circular disk hung on a thin thread 26, as is also shown in FIG. 9. Some similar discs can be hung on a steel ring 27 as also shown in that Figure. The circular disk can be bent or creased in several ways. Other types of reflecting bodies will be known to one skilled in the art.

The spreading of the waves will increase if the regenerating volume also increases. On some occasions it has been found advantageous to use corrugated aluminum or other materials attached to the walls to spread the microwaves. Motor driven moving bodies can also be used. In a preferred embodiment, the air flow for regeneration is used to drive a reflecting wheel or other moving body. An example of a reflecting wheel is shown in FIG. 10. This wheel consists of a thin disc 28 with nine wings 29. The disk can be rotated by air that hits the wings. The number of wings is not essential and any other number may be used for the spreading the microwaves.

A different embodiment of the present invention is shown in FIG. 11, but the same regenerating room 2 with magazine 1, moving body 9 and microwave transmitter 3 is found. To these are added simultaneously operating doors. This apparatus is mainly constructed to be portable. Air is forced in by a fan 38 on the top of the portable apparatus, through an air guiding device or chamber 30 down through the opening 31 to the drying magazine 32 (1) and out of the regenerating room through a perforated plate 33 (14) under the lifted flap 34 (15) and out of the equipment through the tubes 35.

On regenerating, the opening 31 is closed, and a moving door 36 (18) opens a new passage to the regenerating room. Simultaneously, another door 37 (19) closes the entrance to the air guiding part or chamber 30 (17). The air that the fan 38 forces into the equipment now reverses its direction through the magazine 32 (1) and the transmitter is turned on. The flaps 34 close the openings and all the air is guided behind the transmitter 3 so that it hits the wheel 39, which starts to rotate and spread the microwave energy.

The doors 36 and 37 have a double function. As the door 36 opens to the regenerating room, it also closes the outlet tubes 35. On the opposite side, as the door 37 opens free passage to the magazine 30 from the fan 38, it simultaneously closes another outlet 40 for the regenerating air.

This equipment can be used to dry the air in buildings or storage rooms. Only one fan is used and only one tube has to be let to the outside of the building, namely that with the moist regenerating air from the outlet tube 40.

Cellulose or diatomaceous earth known as kieselguhr have been used as drying materials. But many other drying materials can be used.

While the invention has been described in accordance with what is presently conceived to be the most practical and preferred embodiment, it is to be understood that the invention is not to be limited to the disclosed embodiment but on the contrary, is intended to cover various modifications and equivalent arrangements included within the spirit and the scope of the appended claims, which scope is to be accorded the broadest interpretation of such claims so as to encompass all such equivalent structures.

What is claimed is:

1. An apparatus for drying air, comprising:
   a regenerating room which includes at least one wall that reflects microwaves while allowing the passage of air through said at least one wall;
   a drying material for removing and retaining water molecules from moist air forced therethrough;
   means for forcing said moist air through the drying material;
   a removable magazine containing the drying material, the magazine including a transmissive surface which allows the passage of microwaves and said moist air, the magazine operatively engageable with the regenerating room; and
   a microwave transmitter positioned in the regenerating room for producing microwaves which pass through the magazine transmissive surface to the drying material, causing said water molecules retained in the drying material to be vibrated and heated, whereupon the heated water molecules are removable as water vapor from the drying material by forced air, thereby drying the drying material.

2. An apparatus as in claim 1 wherein the drying material absorbs said water molecules.

3. An apparatus as in claim 1 wherein the drying material absorbs said water molecules.

4. An apparatus as claimed in claim 1, further including at least one moving reflecting body in the regenerating room to reflect and evenly distribute the microwaves.

5. An apparatus as claimed in claim 4 wherein the moist air passing through said at least one wall drives the moving reflecting body.

6. An apparatus as in claim 1, wherein a portion of the magazine forms a portion of the regenerating room.

7. An apparatus as claimed in claim 1 where at least one another magazine is used together with the regenerating room, said moist air being forced into the apparatus by a first fan and the forced air being forced out of the apparatus by a second fan and the regenerating room being movable from one magazine to another at preset intervals.

8. An apparatus as claimed in claim 7 wherein the magazines are in the shape of parallelepipeds and form a row and the movement of the regenerating room is performed periodically.

9. An apparatus as claimed in claim 8 wherein the movement of the regenerating room is performed by a motor.

10. An apparatus as claimed in claim 7 wherein the magazines are in the shape of circular sectors and form a disk, the disk being rotatable to position each sector in front of the regenerating room.

11. An apparatus as claimed in claim 1 wherein moist air is forced through the apparatus by a first fan wherein the apparatus comprises several groups of modules and doors, each module comprising a magazine, regenerating room and at least one microwave transmitter, and where regenerated air is forced out of the apparatus by a second fan and where changes from a drying to a regenerating mode are performed by turning of the doors to guide the air.

12. An apparatus as claimed in claim 11 wherein a plurality of doors are turned about at least one axle so as to change the apparatus from drying to regenerating and where the doors are turned according to a time schedule.

13. An apparatus as claimed in claim 11 wherein air dried by the drying material is sucked through a wall with apertures, the apertures in the wall being covered by flexible flaps that open the apertures while drying and close the apertures while regenerating.

14. An apparatus as claimed in claim 1 wherein the moist air is forced through the apparatus by only one fan to a chamber with two chamber doors, the chamber doors being able to change the direction of the air through the magazine and when opening at least one passage through the magazine, simultaneously closing at least one outlet from the apparatus.

15. An apparatus as claimed in claim 14 wherein a perforated plate allows the moist air to pass upon drying but is blocked while regenerating.

* * * * *